United States Patent
McGee

(10) Patent No.: US 9,932,498 B2
(45) Date of Patent: Apr. 3, 2018

(54) EL-TABBED DOUBLE-SIDED TAPE ROLL AND METHOD OF PREPARATION

(75) Inventor: Joseph P. McGee, Kinmount (CA)

(73) Assignee: TABBED TAPE-STRIP CORP., Kinmount, Ontario (CA)

( * ) Notice: Subject to any disclaimer, the term of this patent is extended or adjusted under 35 U.S.C. 154(b) by 493 days.

(21) Appl. No.: 13/609,467

(22) Filed: Sep. 11, 2012

(65) Prior Publication Data

US 2014/0072750 A1    Mar. 13, 2014

(51) Int. Cl.
*C09J 7/02* (2006.01)
*B65H 45/22* (2006.01)

(52) U.S. Cl.
CPC ............... *C09J 7/02* (2013.01); *B65H 45/22* (2013.01); *C09J 2201/128* (2013.01); *C09J 2201/622* (2013.01); *Y10T 428/1476* (2015.01)

(58) Field of Classification Search
USPC .......................... 428/40.1, 42.2, 43
See application file for complete search history.

(56) References Cited

U.S. PATENT DOCUMENTS

| | | | | |
|---|---|---|---|---|
| 2,969,872 A | * | 1/1961 | Chambers | 206/441 |
| 3,747,269 A | * | 7/1973 | Adams | 47/55 |
| 2004/0071918 A1 | * | 4/2004 | Cohen | 428/40.1 |

* cited by examiner

*Primary Examiner* — Patricia L. Nordmeyer

(57) ABSTRACT

A method to create a roll of double sided tape with at least one longitudinal or el-tab along the circumference of the entire roll of double sided tape. These rolls having the el-tab already within the roll can be placed directly into specialized cutting machines.

1 Claim, 3 Drawing Sheets

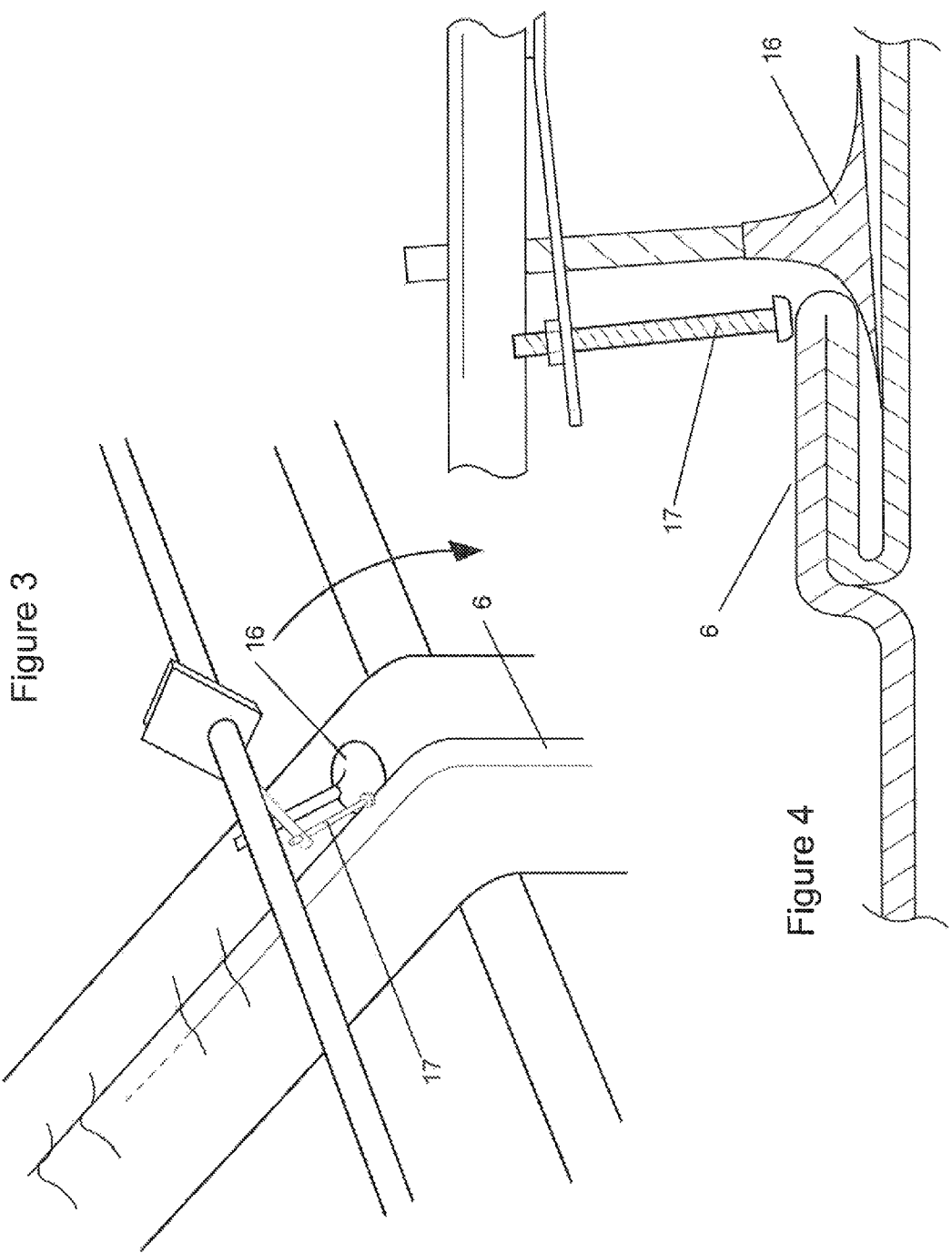

EL-TABBED DOUBLE-SIDED TAPE ROLL AND METHOD OF PREPARATION

FIELD OF THE INVENTION

The present invention relates to double-sided tape and a method of creating a longitudinal "tab" in the release liner along the entire length of a roll of double sided tape.

BACKGROUND OF THE INVENTION

The present invention relates to a roll of double sided tape with at least one longitudinal or el-tab along the circumference of the entire roll of double sided tape. These rolls having the el-tab already within the roll can be placed directly into specialized cutting machines. The machines, such as by way of example, rotary pressure rollers, are equipped with a shaped cutting blade normally used for cutting regular non tabbed rolls of double sided tape into irregular shapes conforming to product articles intended to be adhesively attached to supporting structures. In the prior art, double sided tape is first cut into the desired shapes using these machines, and tabs are later created for each piece of cut tape individually to facilitate removal of the liner during application.

The rolls according to the present invention of el-tab double sided tape eliminates the extra step of individually adding tabs to each irregularly shaped piece of double sided tape. The irregular shaped pieces of tape with the tabs already in place can be easily stacked, packed and shipped to the customer. Regardless of the final shape of the cut pieces of double sided tape, the liner can be removed easily by pulling the el-tab without damaging the crucial adhesive.

Since the el-tab runs along the entire roll of tape, the el-tab rolls according to the present invention are able to be cut into extremely long or large pieces of double sided tape.

SUMMARY OF THE INVENTION

One object of the present invention is to provide a roll of double-sided adhesive tape, comprising an elongate carrier strip, with a length and a standardized width with a pair of opposing edges, defining a pair of opposing planar faces that are separated by a thickness that is substantially smaller than either the length or width, a layer of pressure-sensitive adhesive applied to each of the opposing faces, and a first release liner strip in removable registration atop one of the adhesive layers, and a second release liner in registration atop the other adhesive layer, at least one continuous loop between said opposing edges formed between the first or second release liner strip and corresponding adhesive layers upon which it is in registration, said loop defined by a portion of the release liner between the opposing edges out of registration with the adhesive layer before resuming the registration.

Further features of the invention will be described or will become apparent in the course of the following detailed description.

BRIEF DESCRIPTION OF THE DRAWINGS

In order that the invention may be more clearly understood, embodiments thereof will now be described:

FIG. 3 is a drawing of an enlargement of one section of one embodiment of the mechanism for manufacturing the el-tab double sided tape; and FIG. 4 is a drawing of an enlargement of one embodiment of a tab flattening device.

DESCRIPTION OF A PREFERRED EMBODIMENT

Figure 1:
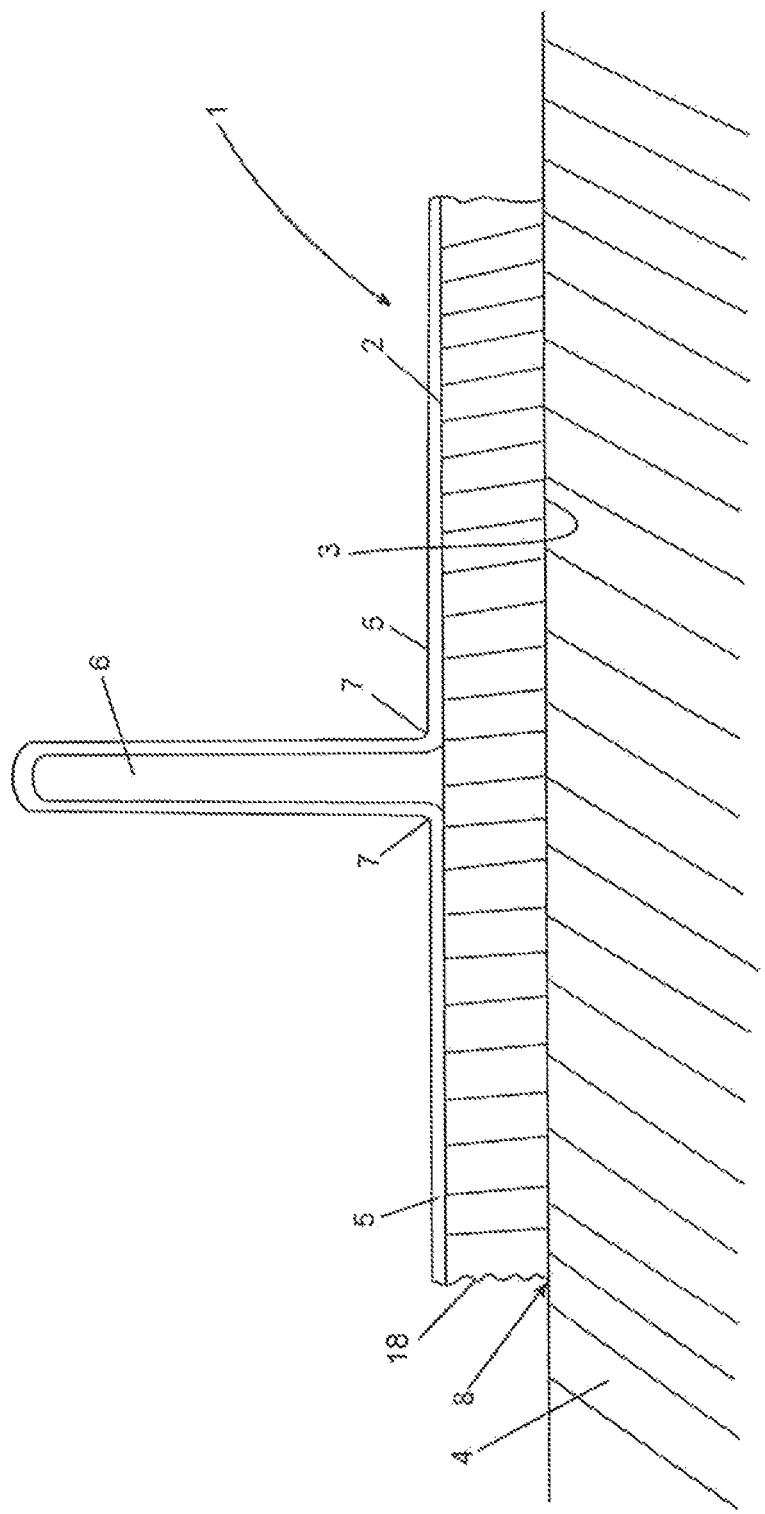
FIG. 1 is a sectional view of a cut piece of a double-sided tape having the improvement of an el-tab in the release liner, with one side already stuck onto a first surface.

Referring to FIG. 1, a sectional view of a cut piece of double-sided tape 1 is shown. The tape 1 has a top side 2 and a bottom side 3 shown adhered to a surface 4. Both sides 2 and 3 have an adhesive coating, particularly a pressure-sensitive adhesive (PSA) coating applied to them. Both the tape and the adhesive will be familiar to those skilled in the art. For example, the tape will typically be a polymeric film, especially a polyethylene film. The adhesive, especially the PSA, will typically be an acrylate material. In many embodiments that will be familiar to those in the art, the tape 1 is on a roll having a defined width W and rolled length, the thickness of the tape being generally substantially smaller than the width. The PSA is applied using known techniques in a thin layer on each of the surfaces 2, 3.

In the depicted embodiment of the double sided tape, the bottom side 3 of the tape 1 is shown attached to part of surface 4 of a product article. The liner 5' (not shown, formerly attached to bottom side 3) is removed and the part is adhesively attached to a desired surface of a product article. In an application of this type, the release liner 5' (not shown) will have been previously removed and bottom side 3 applied in a continuous registration atop the surface 4 as is shown.

When top side 2 of tape 1 is required to be bonded to a second surface according to a manufacturing step or process, the liner 5 is removed to expose the adhesive coating of top side 2. This is accomplished by a simple lifting motion of tab 6, which releases the liner at edges 7, thereafter promoting the easy removal of the entire liner 5 outwardly to the edge.

The integral construction of the tab 6 with liner 5 has the advantage that a single pulling motion of the tab 6 commences the removal of liner 5 from tape 1 in both directions at 7 towards the edges of the piece of tape 1. Optionally, the tab 6 can be cut at its apex to allow removal of the liner 5 to either side in two stages.

As can be seen from FIG. 1, the tab 6 is located at a distance from tape edge 18 of tape 1. The advantage of locating the tab 6 away from tape edge 18 is that during the operation of removing liner 5 the disengagement of liner 5 from the top adhesive side 2 takes place in a direction toward the tape edge 18. This eliminates the "lift-off" effect that would occur underneath at the edge point at stress point 8 if the lifting of the liner 5 took place at the tape edge 18.

Figure 2:
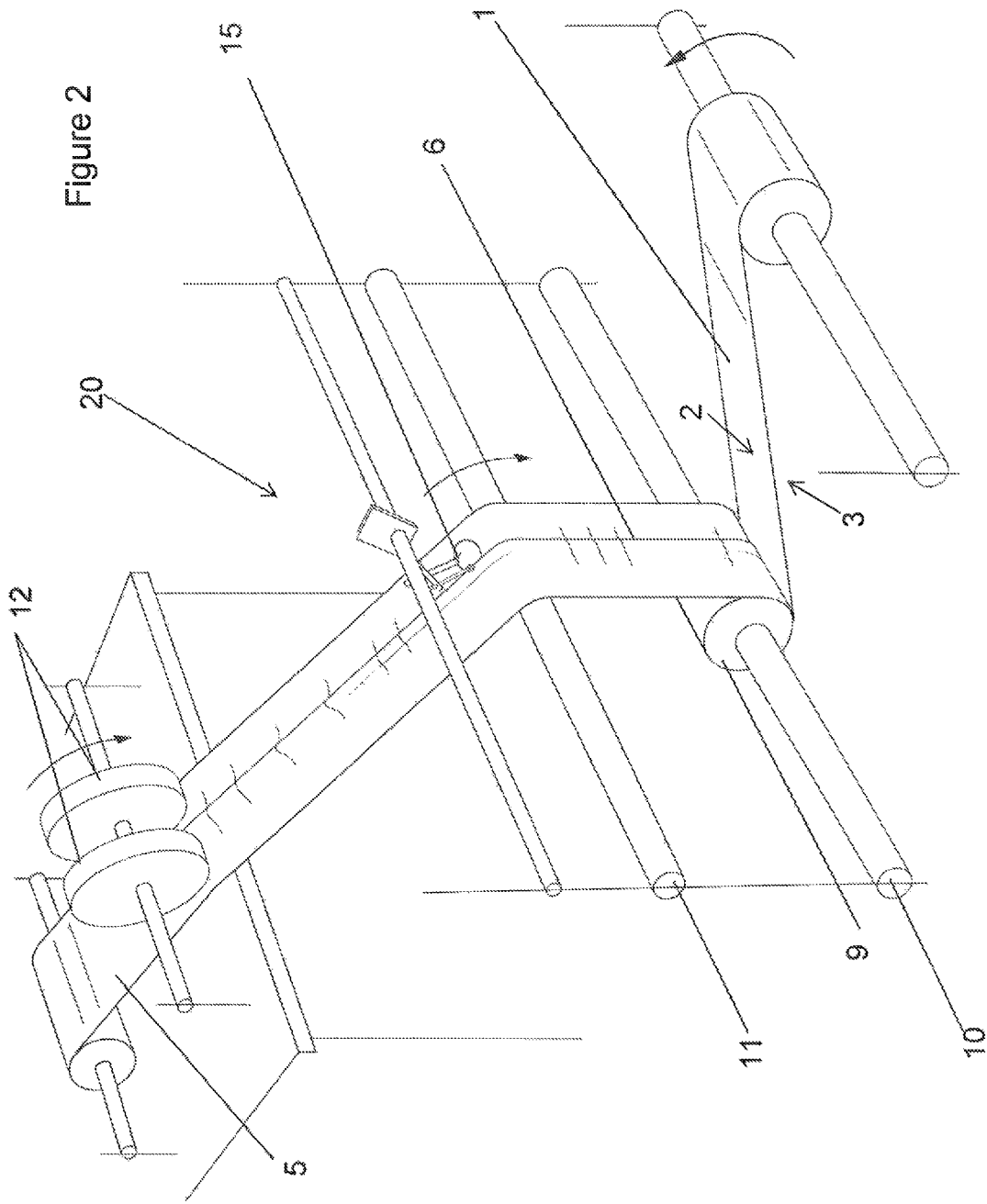
FIG. 2 is a drawing of one embodiment of the mechanism for manufacturing the el-tab double sided tape.

The solution provided herein is to provide a tape in which the width of the liner 5 is greater than the width of the tape 1 as shown in FIG. 2. Prior to attaching the release liner to the tape, excess liner is pulled together, forming a loop or tab 6 and then folded upon itself. The liner with the folded tab already in place is then adhered to the roll of tape 1. The tab 6 is a portion of release liner not adhesively attached to the tape. The new roll of tape has a loop or tab rolled circumferentially around the longitudinal axis of the roll of tape.

Location of the release liner 5 in this looped fashion atop the tape 1 allows the roll of tape to be wound upon itself in a roll, so that it may be dispensed in a manner similar to that used with conventional single-sided adhesive tape or regular double sided tape. For example, the tabbed roll may be placed directly into cutting machinery, such as for example, rotary pressure rollers equipped with a steel-rule die. In rolling the tape up into a roll, at least one tab runs continuously along the entire length of the roll of tape. The length of tab 6 is equal to the length of the roll of tape.

While the illustrated embodiment shows a single loop formed in the release liner along its registration on the tape 1, it is evident that a plurality of loops or tabs may be formed in the liner. A plurality of longitudinal tabs in spaced apart relationship may be desired for irregular shaped pieces of tape.

In one embodiment, some or all of the loops may be cut transversely at the apex of the loop. This allows the separate ends to serve as tabs which may be readily grasped and pulled to perform the peeling operation as required.

Referring to FIGS. 2, 3 and 4, the machine 20 consists of two feed rolls, one for the protective liner 5 and one for the roll of tape 1. The tape 1, earlier joined with the carrier liner (not shown) on the bottom side 3, has a top side 2 free to bind with the protective liner 5.

The protective liner 5 has a width greater than the width of the roll of tape 1. From the feed roll, the protective liner 5 is drawn towards a roller 11 passing underneath a double wheel 12. A portion of liner is drawn toward the middle of the double wheels 12. As the liner 5 gets pulled toward the middle of the two wheels, a small amount of liner 5 is collected between the two wheels. The width of liner 5 is decreased after the formation of tab 6 by the double wheels 12. The collected liner gathered by the double wheels then passes beneath a tab flattening device 15. The tab flattening device 15 consists of a bell shaped stopper like device 16 with a smooth and flat bottom and an inverted screw 17. The liner collected by the double wheels 12 runs between the bottom of the stopper like device 16 and the head of the inverted screw 17, thereby flattening the excess liner and forming a uniformly dimensioned tab 6 throughout the entire length of the roll of liner.

The liner 5 now containing tab 6 continues past roller 11 towards the winding roller 10, where the liner adheres to the roll of tape 1. The adhesive tape 1 and the tabbed liner 6 are rolled together on the final tape log 9.

A close up of the flattening device 15 is shown in FIG. 3. Tab 6 is formed by the creation of slack in the protective liner 5 by the double wheels 12 and the flattening device 15.

As stated, an advantage of the manufacture of tab 6 which is rolled circumferentially around the longitudinal axis of the roll of tape is the ability to provide a continuous tab running the entire length of the final tape log 9. A roll of tape with tab 6 running through the entire length can be easily used with various rotary dies and other dies. The final tape log 9 can be fed into the specialized cutting machine resulting in a continuous stamping of irregular shapes by the rotating die wherein each irregular shape contains at least one tab. This method allows for efficient nesting of the parts and is a significant feature reducing matrix waste.

The width of the tape 1 is adjustable and the number of tabs 6 running through the entire length of the tape 1 is also adjustable by adding additional double wheels 12 and flattening devices 15. The spacing of the tabs 6 is determined by controlling the spacing between the double wheels 12 and correspondingly, the flattening devices 15.

The number of tabs created in the liner and the distance between each of the tabs as well as the width and length of roll of tape is customizable to the desired final piece of irregularly shaped tape. Once those parameters are chosen, the tape with the longitudinal tabs in place can be placed directly into the exiting machinery to be cut.

Other advantages, which are inherent to the structure, are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A roll of double-sided adhesive tape, comprising:
    an elongate carrier strip, with a length and a width with a pair of opposing edges, defining a pair of opposing planar faces that are separated by a thickness that is substantially smaller than either the length or width, a layer of pressure-sensitive adhesive applied to each of the opposing faces, and a first release liner strip in removable registration atop one of the adhesive layers, and a second release liner in registration atop the other adhesive layer,
    at least one continuous loop between said opposing edges formed in the first or second release liner strip on the corresponding adhesive layer upon which it is in registration, said loop defined by a portion of the release liner between the opposing edges out of registration with the adhesive layer before resuming the registration.

* * * * *